H. KNIGHT.
MAKING WATER OR OTHER PIPES.

No. 42,952. Patented May 31, 1864.

UNITED STATES PATENT OFFICE.

HENRY KNIGHT, OF BROOKLYN, NEW YORK.

IMPROVEMENT IN MAKING WATER AND OTHER PIPES.

Specification forming part of Letters Patent No. 42,952, dated May 31, 1864.

*To all whom it may concern:*

Be it known that I, HENRY KNIGHT, of Brooklyn, in the county of Kings and State of New York, have invented a new and useful Improvement in the Mode of Working the Follower or Former Used in Lining Water and other Pipes with Cement; and I do hereby declare that the following is a full, clear, and exact description of the same, reference being had to the accompanying drawings, forming part of this specification, in which—

Figure 2:
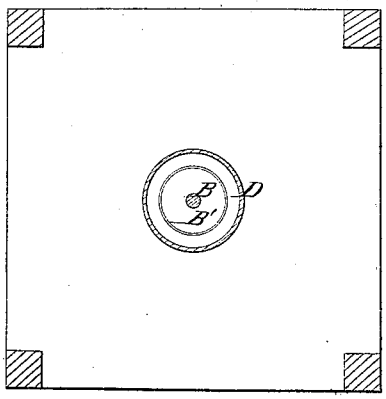
Figure 1:
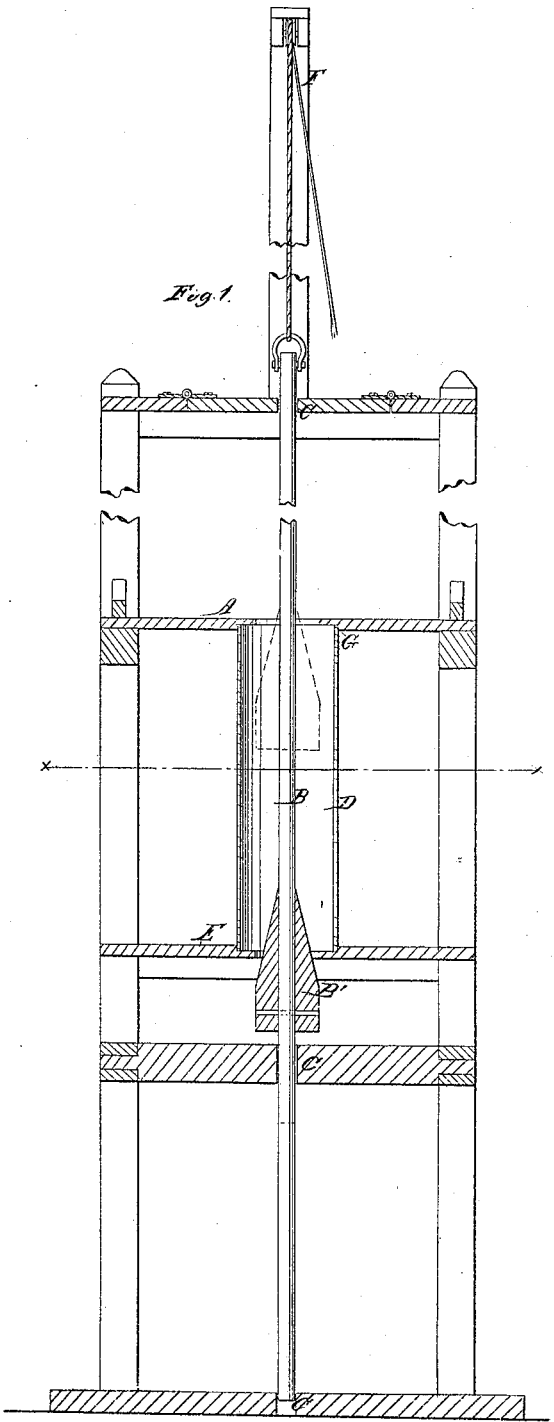

Figure 1 is a vertical sectional view; Fig. 2, a vertical view.

The same letters of reference in the two figures indicate corresponding parts.

The invention hereinafter described relates to a modification of the centrally-guided cone or follower for laying cement equally upon the inner surface of water-pipe, patented to me on the 15th August, 1863, No. 39,519.

My present improvement consists in making the cone and guide-rod in one piece, or a fixture with one another, and moving both the rod and the cone together through the pipe, the rod to be guided in its movement by the frame of the mold or pipe.

In my patent above referred to the same result is accomplished as is accomplished here, but the mode of employing a central guide is different in this respect, to wit: The cone in my patent moves over the stationary guide-rod, whereas here the rod and cone move together, and the rod, in order to center the cone, requires to be guided by the frame of the mold or pipe. It may be that my patent embraces the invention herein described, inasmuch as the central rod in both cases centers the cone, and the centering of the cone is the vital matter in a contrivance for the purpose named—that is to say, centering by means of a rod or device passed through the cone; but if such is not the case it is my desire to secure the particular mode hereinafter described by this separate patent, inasmuch as the same cannot well be introduced into a reissue.

To enable others skilled in the art to make and use my invention, I will proceed to describe the same with reference to the drawings.

In general, the machine or mold which I employ is substantially the same as that shown and described in my patent above referred to, and the operation of lining the pipe with cement is also about the same, except that the cone and rod are moved together, and the rod is guided by the machine or frame thereof.

In the drawings, A is the table; B, the guide or centering bar; C C, guides for the bar to move through; D, a metallic pipe to be lined with cement, and E a bed plate for steadying and supporting the pipe. The bar B has a protuberance, B', of conic form, fastened to it by means of a pin or set-screw, or wrought firmly with it, and is fitted to move through the guides C C, as shown. This bar is operated by means of a windlass, E, jack-screw, or otherwise, as deemed desirable. The table A holds the pipe D central around the bar B by means of the groove G in the under side of the table A. This table also prevents the pipe from rising as the bar is drawn up through the pipe.

Stops may be provided on the bar or frame to control the extent of up and down movement of the bar.

The cone, when not made solid with the bar, can be set free on the bar after it has cleared the top of the pipe, thus allowing that part of the bar which is below the cone to pass up and also clear the top of the pipe.

It is obvious that the cone and rod guided as herein described will answer for making drain-pipe entirely of cement. In this case a flask or divided metal mold, as commonly, is used in place of the pipe D.

It is also obvious that the rod B, with cone B', may be so arranged as to admit of being moved downward out of the mold or pipe, or horizontally, if desired.

I do not claim a cone with guides on its circumference; but

What I claim as my invention, and desire to secure by Letters Patent, is—

The guided centering-bar B, with a conical enlargement, B', made fast upon it, the said bar and cone moving together, substantially as and for the purpose described.

HENRY KNIGHT.

Witnesses:
CHARLES FOWLER,
GEORGE JONES.